(12) United States Patent
Huelke

(10) Patent No.: US 8,066,316 B2
(45) Date of Patent: Nov. 29, 2011

(54) ADJUSTABLE MOUNTING SYSTEM FOR VEHICULAR BODY COMPONENTS

(75) Inventor: David Huelke, Milan, MI (US)

(73) Assignee: Ford Global Technologies, Dearborn, MI (US)

( * ) Notice: Subject to any disclaimer, the term of this patent is extended or adjusted under 35 U.S.C. 154(b) by 120 days.

(21) Appl. No.: 12/684,782

(22) Filed: Jan. 8, 2010

(65) Prior Publication Data

US 2011/0169295 A1    Jul. 14, 2011

(51) Int. Cl.
    *B60J 3/00*    (2006.01)
(52) U.S. Cl. ..................................................... 296/97.9
(58) Field of Classification Search ................. 296/97.9; 24/295; 411/173
    See application file for complete search history.

(56) References Cited

U.S. PATENT DOCUMENTS

| 2,199,347 | A | * | 4/1940 | Roethel | 24/293 |
| 3,210,032 | A | * | 10/1965 | Van Slyke | 248/73 |
| 4,606,688 | A | * | 8/1986 | Moran et al. | 411/175 |
| 5,636,891 | A | * | 6/1997 | Van Order et al. | 296/37.7 |
| 6,179,366 | B1 | * | 1/2001 | Hansz | 296/97.9 |
| 6,196,756 | B1 | * | 3/2001 | Leverger | 403/326 |
| 6,353,981 | B1 | * | 3/2002 | Smith | 24/295 |
| 6,659,527 | B1 | * | 12/2003 | Wilson | 296/97.11 |
| 6,976,292 | B2 | * | 12/2005 | MacPherson et al. | 24/293 |
| 7,165,371 | B2 | * | 1/2007 | Yoyasu | 52/716.5 |
| 7,226,260 | B2 | * | 6/2007 | Jackson et al. | 411/173 |
| 7,438,341 | B1 | * | 10/2008 | Olson, Jr. | 296/97.9 |

* cited by examiner

*Primary Examiner* — Kiran B. Patel
(74) *Attorney, Agent, or Firm* — Jerome R. Drouillard; Greg P. Brown

(57) ABSTRACT

An adjustable mounting system for a vehicular body component includes a base having a number of slide rails, with retainers slidingly engaged with the slide rails. Each retainer has a retention section for mounting the base to a surface within the vehicular body, which is attached to a slidably mounted pediment. Fastener retainers located within the pediments allow devices such as interior trim pieces to be attached to the adjustable mounting system.

4 Claims, 3 Drawing Sheets

ADJUSTABLE MOUNTING SYSTEM FOR VEHICULAR BODY COMPONENTS

BACKGROUND OF THE INVENTION

1. Field of the Invention

The present invention relates to a mounting system for attaching various components, such as interior trim items, to a vehicular body, such as a body of a passenger automobile or truck.

2. Related Art

The production of high-quality automotive vehicles requires that various items be attached to the interior and exterior of a vehicle in a manner which is secure, to prevent inadvertent detachment of the items, such as trim items. Moreover, attachment hardware must be free from noise emanation during operation of a vehicle, and the attachment devices must be easily applied during production of vehicles. Stated another way, the direct labor cost required to install a mounting system must be low, especially given the current hypercompetitive nature of the automotive business.

Another desire of automotive manufacturers is to minimize the number of parts and pieces needed to produce a full line of vehicles. If a given component may be used throughout a manufacturer's range of vehicles, costs may be greatly reduced because of the absence of a need to tool individual parts for various vehicle lines.

It would be desirable to provide an adjustable mounting system for vehicle body components which is easily installed and which accommodates various spacings preferred for applying the fasteners of items attached to the mounting system.

SUMMARY OF THE INVENTION

According to an aspect of the present invention, an adjustable mounting system for a vehicular body component includes a base having a number of slide rails, and a number of retainers engaged with the slide rails and extending through the base, with each of the retainers including at least one retention section for mounting the base to a surface within a vehicular body, and with a pediment attached to the retention section of each retainer, with the pediment being retained upon, and slidingly engaged with, the slide rails.

According to another aspect of the present invention, the pediments further include fastener retainers located on the pediments between the portions of the pediment engaged with the slide rails.

According to another aspect of the present invention, the retainers are adjustable with respect to the base by sliding one or more of the retainers along the slide rails, so as to adjust the distance between the retainers. The retention section of each of the retainers preferably includes a push-to-lock structure which is manually engageable with a mounting surface provided on a vehicle.

According to another aspect of the present invention, the adjustable mounting system may further include a sun visor assembly mounted with fasteners extending into the fastener retainers.

According to another aspect of the present invention, an adjustable mounting system further includes a combination locating pin and clearance verifier extending from the base in the same direction as the retainers.

According to another aspect of the present invention, each of the slidably adjustable pediments is retained upon the slide rails by at least one integral upper rail contacting foot and by at least one lower rail contacting foot.

It is an advantage of an adjustable mounting system according to the present invention that differences in the accessory mounting provisions of various vehicles may be accommodated by a single mounting system, without the need for expensive retooling to produce a number of discrete, and yet similar, mounting systems.

It is another advantage of an adjustable mounting system according to the present invention that minor changes in geometry which sometimes creep into production processes may be accommodated without the need for corrective tooling changes.

It is another advantage of an adjustable mounting system according to the present invention that inventory reduction in terms of different types or numbers of part numbers needed by a manufacturer of vehicle bodies, is a likely outcome.

Other advantages, as well as features of the present system, will become apparent to the reader of this specification.

DETAILED DESCRIPTION OF THE PREFERRED EMBODIMENTS

Figure 1:
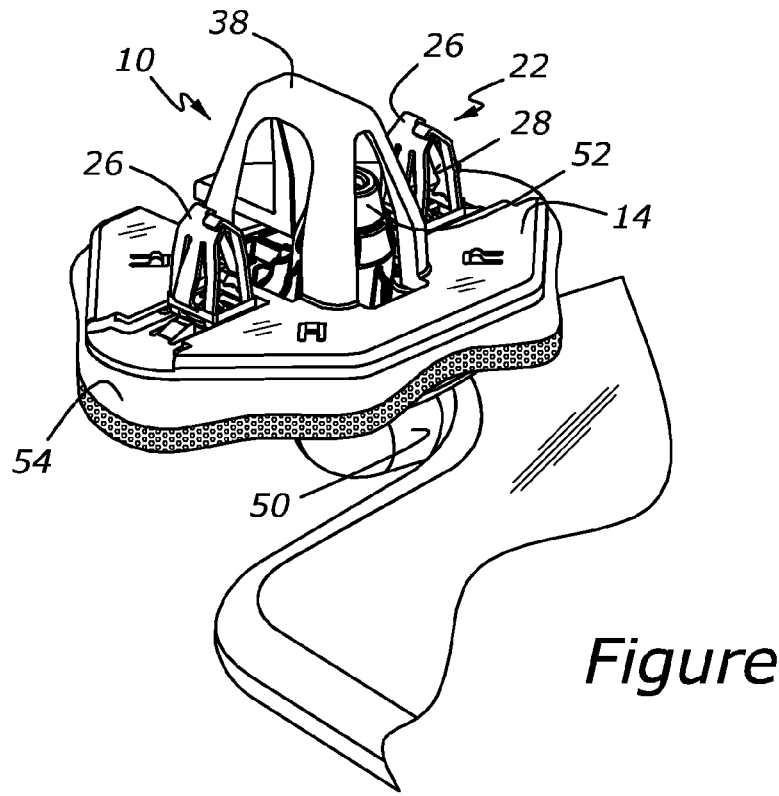
FIG. 1 is a perspective view of an adjustable mounting system for a vehicular body component according to the present invention, having a sun visor mounted thereto.

As shown in FIG. 1, adjustable mounting system 10 provides a mounting position for a sun visor assembly, 50. Adjustable mounting system 10 is adapted to project upwardly through a body inner panel, such as that shown in FIG. 6. As shown in the various figures, adjustable mounting system 10 is locked into position into an inner panel by retainers, 22, which are slidably mounted to slide rails 18, contained upon a base, 14, of the adjustable mounting system. It is preferred that base 14 be one piece with slide rails 18.

Each of retainers 22 has a retention section, 26, which includes spring-loaded barbs 28, which are attached to a pediment 30. Barbs 28 allow retention sections 26 to function as push-to-lock fastenings. Pediments 30 have upper rail contacting feet 42 and lower rail contacting feet 46, which allow pediments 30, and, indeed, the entirety of retainers 22 to slide along slide rails 18, thereby varying the distance between not only retainers 22, but also the distance between fastener retainers 34 which are formed in pediments 30. Fastener retainers 34 may be either threaded holes to hold threaded fasteners, or various types of slotted holes compatible with Dzus fasteners, or yet other types of fastener retainers, such as holes suitable for blind riveting, etc.

Figure 2:
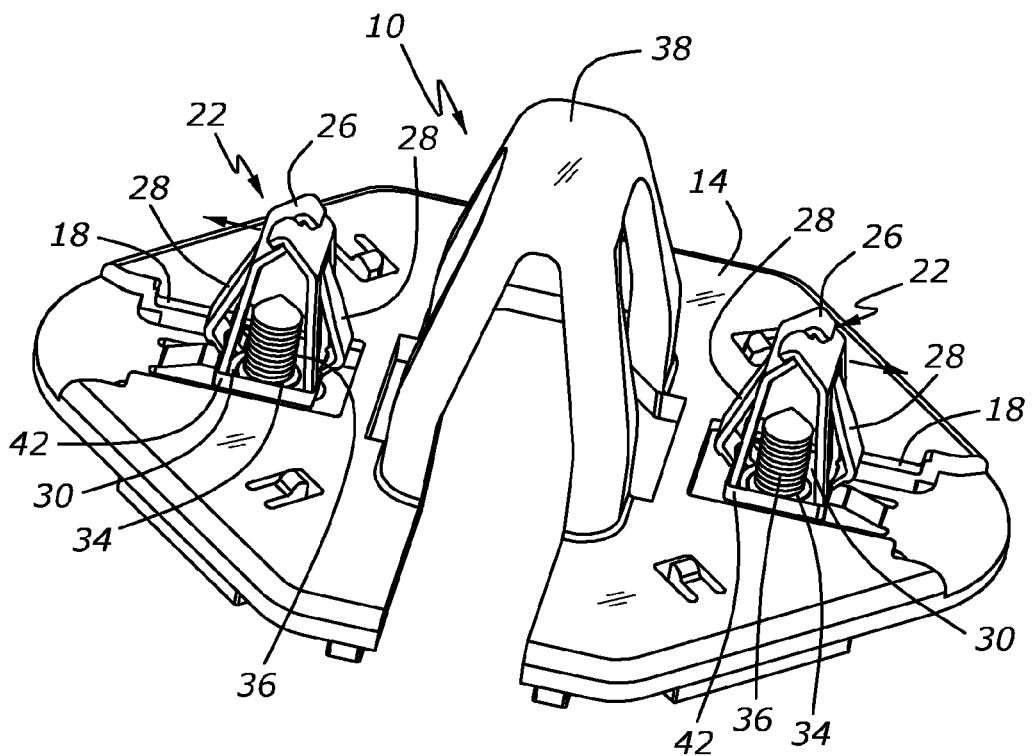
FIG. 2 is a perspective view of a top side of the present adjustable mounting system, showing retainers in an outwardly extended orientation.
Figure 3:
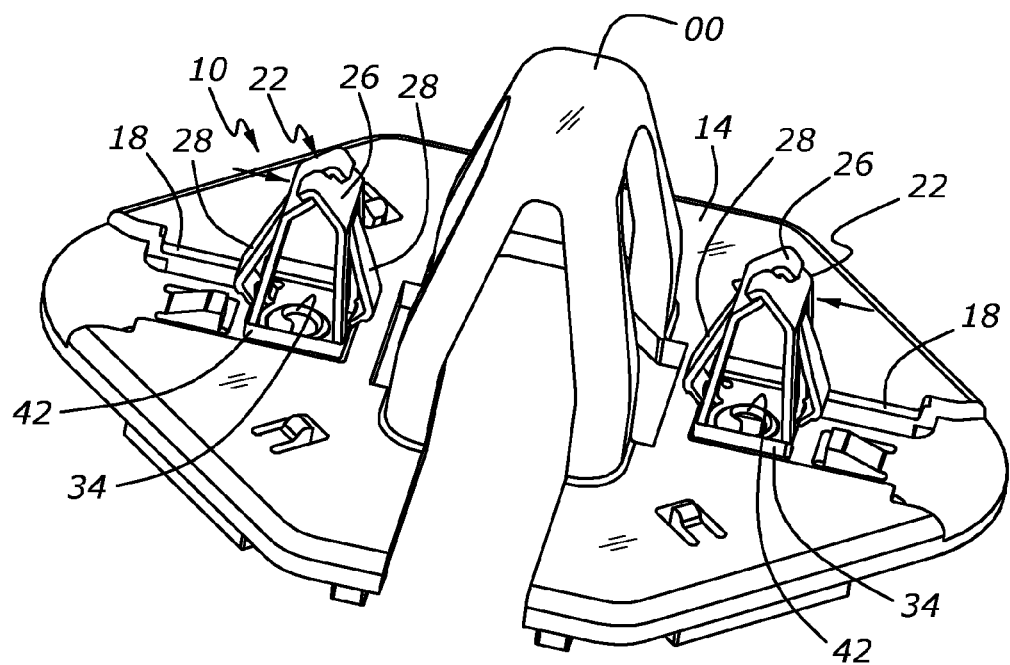
FIG. 3 is similar to FIG. 2, but shows two retainers in an inwardly extended orientation.
Figure 4:
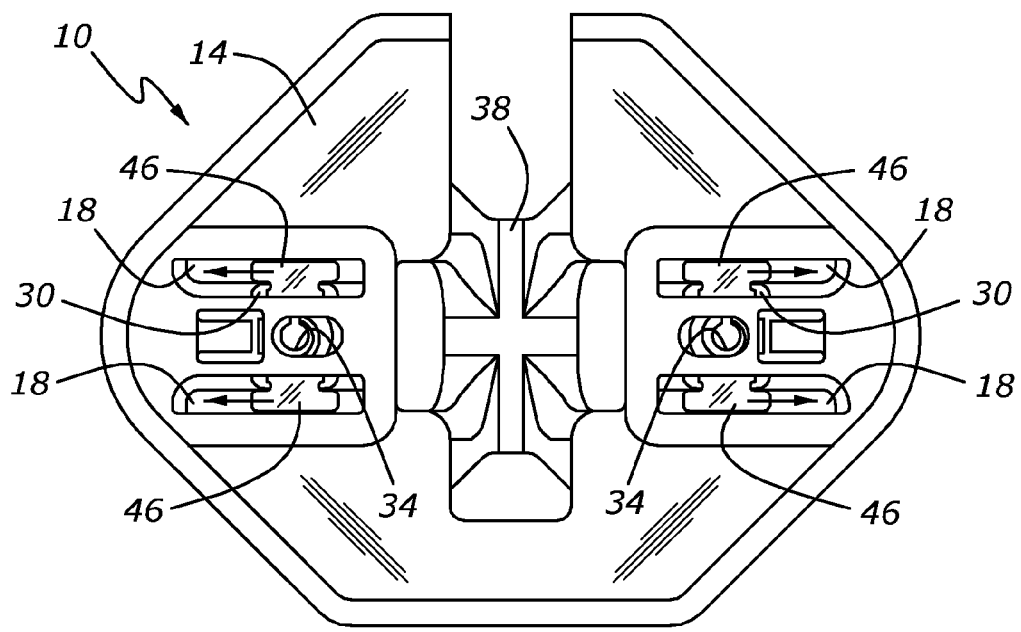
FIG. 4 is a bottom view of the retainer of the adjustable mounting system shown in FIG. 2, showing retainers in the outwardly adjusted location.
Figure 5:
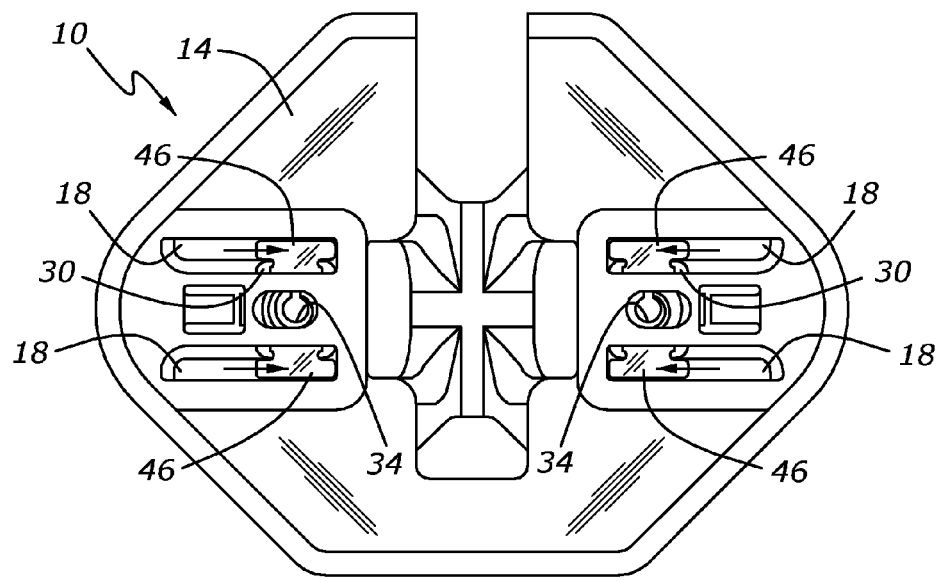
FIG. 5 is similar to FIG. 4, but shows the retainers in an inwardly adjusted position.

FIGS. 2 and 4 show retainers 22, as well as pediments 30, and fastener retainers 34, as being in their locations in which retainers 22 achieve the farthest spread between fastener retainers 34. On the other hand, in FIGS. 3 and 5, retainers 22, as well as fastener retainers 34 and pediments 30, are in a minimum spread position.

Base 14, in addition to providing mounting provisions for retainers 22, also provides mounting for an integral, one-piece locating pin and clearance verifier 38. As shown in the various figures, pin and clearance verifier 38 provides both a tactile guide for an operator installing the present adjustable mounting system, and also a positive check of the clearance to allow insertion of a device into the adjustable mounting system. Accordingly, as seen in FIG. 1, a shank, 52, of sun visor assembly 50, protrudes into the volume defined by locating pin and clearance verifier 38, so as to allow visor assembly 50 to be freely installed through the use of threaded fasteners, which are shown at 36 in FIG. 2.

Figure 6:
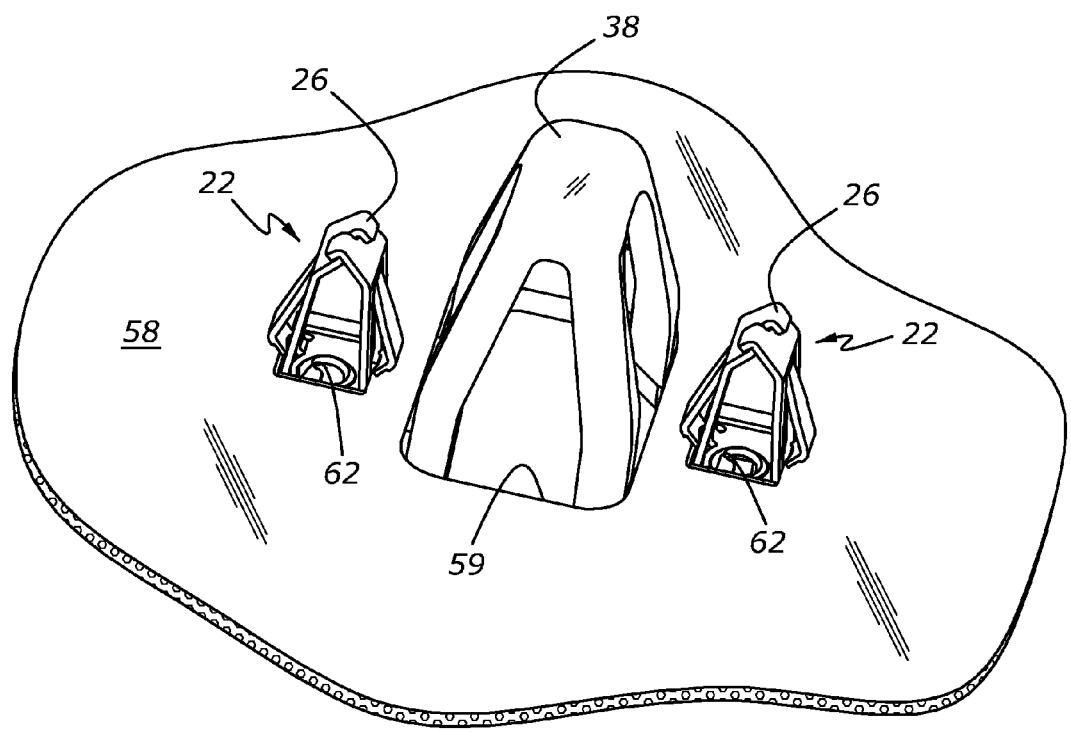
FIG. 6 is similar to FIGS. 2 and 3, but shows an adjustable mounting system locked in place upon a vehicle body inner panel, such as a door inner panel, or a windshield header, or any other inner panel having three formed holes as illustrated.

An adjustable mounting system according to the present invention may be employed according to the following method. First, an item such as the illustrated sun visor 50 may be attached to a panel, such as a headliner 54 (FIG. 1), by attaching screws 36 through fastener retainers 34. Then, the completed headliner may be taken to a vehicle assembly location and mounted to a vehicle body inner panel, 58, by first piloting pin and clearance verifier 38 into hole 59, followed by pushing to lock retention sections 26 into appropriately punched holes, 62, as shown in FIG. 6. It is thus seen that there is no need for any manipulation of fasteners such as nuts, bolts, screws or rivets during the final assembly of a sun visor and headliner, for example, to a vehicle. Of course, once screws 36 are driven into fastener retainers 34 within pediments 30, pediments 30 are no longer able to move freely along slide rails 18, and the spacing of retention sections 26 is therefore precisely set to allow proper engagement of the retention sections 26 with vehicle inner panel 58, such as a door inner panel or windshield header, in the case of a headliner.

Those skilled in the art will appreciate in view of this disclosure that the present adjustable mounting system could be used not only in automotive vehicles such as passenger cars and trucks, but also in vehicular bodies such as those used in aircraft and watercraft.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. An adjustable mounting system for a vehicular body component, comprising:
    a one-piece base having a plurality of slide rails defining a slide track; and
    a plurality of retainers engaged with, and extending through said base between the slide rails, with each of said retainers comprising:
    at least one push-to-lock retention section for mounting said base to a surface within a vehicular body; and
    a slidably adjustable pediment having a fastener retainer, with said slidably adjustable pediment being attached to said retention section, with said pediment being retained upon, and slidingly engaged with, said slide rails, whereby the distance between said retainers may be adjusted.

2. An adjustable mounting system according to claim 1, further comprising a combination locating pin and clearance verifier extending from said base from a location between said retainers, and in the same direction as said retainers.

3. An adjustable mounting system according to claim 1, wherein each slidably adjustable pediment is retained upon said slide rails by at least one integral upper rail contacting foot and by at least one lower rail contacting foot.

4. An adjustable mounting system according to claim 1, wherein said push-to-lock retention section and said pediment of each of said retainers is one-piece.

\* \* \* \* \*